United States Patent
Aguayo Gonzalez et al.

(10) Patent No.: US 10,872,140 B2
(45) Date of Patent: Dec. 22, 2020

(54) METHODS AND APPARATUSES FOR VALIDATING SUPPLY CHAIN FOR ELECTRONIC DEVICES USING SIDE-CHANNEL INFORMATION IN A SIGNATURE ANALYSIS

(71) Applicant: Power Fingerprinting Inc., Vienna, VA (US)

(72) Inventors: Carlos R. Aguayo Gonzalez, Reston, VA (US); Jeffrey H. Reed, Blacksburg, VA (US); Steven C. Chen, Potomac, MD (US)

(73) Assignee: Power Fingerprinting Inc., Vienna, VA (US)

( * ) Notice: Subject to any disclaimer, the term of this patent is extended or adjusted under 35 U.S.C. 154(b) by 281 days.

(21) Appl. No.: 15/368,216

(22) Filed: Dec. 2, 2016

(65) Prior Publication Data
US 2017/0161485 A1    Jun. 8, 2017

Related U.S. Application Data

(60) Provisional application No. 62/262,181, filed on Dec. 2, 2015.

(51) Int. Cl.
*G06F 21/00*    (2013.01)
*H04L 29/06*    (2006.01)
(Continued)

(52) U.S. Cl.
CPC .............. *G06F 21/44* (2013.01); *G06F 21/76* (2013.01)

(58) Field of Classification Search
CPC ......... G06F 21/44; G06F 21/76; G06F 21/558
See application file for complete search history.

(56) References Cited

U.S. PATENT DOCUMENTS

2008/0091975 A1    4/2008   Kladko et al.
2009/0085737 A1    4/2009   Estevez et al.
(Continued)

FOREIGN PATENT DOCUMENTS

WO    WO-2014/144857 A2    9/2014
WO    WO-2020073059 A1 *  4/2020  ........... G06F 21/567

OTHER PUBLICATIONS

James Shey ; Naghmeh Karimi ; Ryan Robucci ; Chintan Patel; "Design-Based Fingerprinting Using Side-Channel Power Analysis for Protection Against IC Piracy"; 2018 IEEE Computer Society Annual Symposium on VLSI (ISVLSI); Publisher: IEEE; pp. 614-619 (Year: 2018).*

(Continued)

*Primary Examiner* — Fatoumata Traore
*Assistant Examiner* — Courtney D Fields
(74) *Attorney, Agent, or Firm* — Cooley LLP (57) ABSTRACT

Some embodiments described herein include a method to validate supply chains for electronic devices using side-channel information in a signature analysis. The method includes sending, to a target device, a first signal associated with a set of codes to be executed by the target device, and then receiving first side-channel information associated with the target device in response to the target device executing the set of codes. The method also includes determining second side-channel information associated with a simulated device in response to the set of codes. The method further includes comparing a discriminatory feature of the first side-channel information with a discriminatory feature of the second side-channel information to determine a characteristic of the target device based on a pre-determined characteristic of the simulated device. Finally, the method includes sending, to a user interface, a second signal associated with the characteristic of the target device.

24 Claims, 3 Drawing Sheets

(51) Int. Cl.
    *G06F 21/44*    (2013.01)
    *G06F 21/76*    (2013.01)
    *G06F 21/52*    (2013.01)
    *G06F 21/55*    (2013.01)
    *G06F 21/56*    (2013.01)
    *G06F 11/30*    (2006.01)

(56) References Cited

U.S. PATENT DOCUMENTS

| | | |
|---|---|---|
| 2010/0017622 A1 | 1/2010 | Grinchuk et al. |
| 2010/0033386 A1 | 2/2010 | Lewis et al. |
| 2012/0223403 A1 | 9/2012 | Keller, III et al. |
| 2012/0331309 A1 | 12/2012 | Scott et al. |
| 2013/0019324 A1* | 1/2013 | Tehranipoor ......... H03K 3/0315 726/34 |
| 2013/0318607 A1 | 11/2013 | Reed et al. |
| 2015/0317475 A1 | 11/2015 | Aguayo Gonzalez et al. |
| 2015/0373036 A1* | 12/2015 | Patne .................. H04L 63/1416 726/23 |
| 2016/0371487 A1* | 12/2016 | Poornachandran ... G06F 21/554 |

OTHER PUBLICATIONS

International Search Report and Written Opinion issued to international patent application No. PCT/US2016/064743, Feb. 16, 2017, 13 pgs.

Extended Search Report for European Application No. 16871627.2, dated Jul. 2 2019, 10 pages.

\* cited by examiner

METHODS AND APPARATUSES FOR VALIDATING SUPPLY CHAIN FOR ELECTRONIC DEVICES USING SIDE-CHANNEL INFORMATION IN A SIGNATURE ANALYSIS

CROSS-REFERENCE TO RELATED APPLICATION

This application claims priority to U.S. Provisional Patent Application Ser. No. 62/262,181, filed on Dec. 2, 2015.

This application is related to U.S. patent application Ser. No. 13/883,105, having a 35 U.S.C. § 371(c) date of Aug. 15, 2013 (U.S. Pat. No. 9,262,632), entitled "Using Power Fingerprinting (PFP) To Monitor The Integrity And Enhance Security Of Computer Based Systems."

This application is related to U.S. patent application Ser. No. 14/720,497, filed on May 22, 2015 (U.S. Pat. No. 9,268,938), entitled "Systems, Methods, and Apparatuses For Intrusion Detection And Analytics Using Power Characteristics Such As Side-Channel Information Collection."

The contents of the aforementioned applications are incorporated herein by reference in their entirety.

BACKGROUND

Some embodiments described herein relate generally to methods and apparatus for a signature analysis. In particular, but not by way of limitation, some embodiments described herein relate to methods and apparatus for using side-channel information in a signature analysis to validate supply chains for electronic devices.

When fabricating an electronic device with integrated circuits, computer code (e.g., very high speed integrated circuit hardware Description Language (VHDL)) describing the electronic device can be sent to a foundry for fabrication. During the fabrication process, it is possible for a hardware Trojan (e.g., a malicious modification of the circuitry of an integrated circuit) to be inserted in the electronic device. It is also possible that the electronic device is not manufactured at an authorized foundry resulting in undesired variances (e.g., layout, aged components, etc.) of the electronic device.

Techniques such as simulation, functional analysis, or visual inspection have been used to evaluate an electronic device fabricated at a foundry. It is, however, difficult to detect the layout and/or fabrication details using simulation. Functional analysis (e.g., measuring an expected output of an electronic device under an input) fails to determine if the electronic device was manufactured at the correct fabrication foundry or if aged or recycled components were used during fabrication, even if the electronic device passes functional testing. Visual inspection often involves destructive inspection such as removing the packaging and viewing the layout.

Accordingly, a need exists for methods and apparatus for validating, in a non-destructive way, supply chains for electronic devices fabricated in a foundry.

SUMMARY

Some embodiments described herein include an apparatus having a memory and a processor operatively coupled to the memory. The processor is configured to be coupled to an electronic device, which has a pre-determined characteristic. The processor is configured to send to the electronic device a signal associated with a set of codes to be executed by the electronic device and receive first side-channel information associated with the electronic device in response to the electronic device executing the set of codes. The processor is then configured to define a simulated device based on the first side-channel information and the electronic device. The simulated device simulates the electronic device. Subsequently, the processor is configured to determine second side-channel information based on the simulated device and in response to the set of codes. The processor is configured to determine a set of parameters associated with the simulated device such that a discriminatory feature of the first side-channel information and a discriminatory feature of the second side-channel information substantially match. The processor is configured to store the simulated device and the set of parameters in the memory.

Some embodiments described herein include a method to validate supply chains for electronic devices using side-channel information in a signature analysis. The method includes sending, to a target device, a first signal associated with a set of codes to be executed by the target device, and then receiving first side-channel information associated with the target device in response to the target device executing the set of codes. The method also includes determining second side-channel information associated with a simulated device in response to the set of codes. The simulated device has a pre-determined characteristic. The method further includes comparing a discriminatory feature of the first side-channel information with a discriminatory feature of the second side-channel information to determine a characteristic of the target device based on the pre-determined characteristic of the simulated device. Finally, the method includes sending, to a user interface, a second signal associated with the characteristic of the target device.

DETAILED DESCRIPTION

Some embodiments described herein include an apparatus having a memory and a processor operatively coupled to the memory. The processor is configured to be coupled to an electronic device, which has a pre-determined characteristic. The processor is configured to send to the electronic device a signal associated with a set of codes to be executed by the electronic device and receive first side-channel information associated with the electronic device in response to the electronic device executing the set of codes. The processor is then configured to define a simulated device based on the first side-channel information and the electronic device. The simulated device simulates the electronic device. Subsequently, the processor is configured to determine second side-channel information based on the simulated device and in response to the set of codes. The processor is configured to determine a set of parameters associated with the simulated device such that a discriminatory feature of the first side-channel information and a discriminatory feature of the second side-channel information substantially match. The processor is configured to store the simulated device and the set of parameters in the memory.

Some embodiments described herein include a method to validate supply chains for electronic devices using side-channel information in a signature analysis. The method includes sending, to a target device, a first signal associated with a set of codes to be executed by the target device, and then receiving first side-channel information associated with the target device in response to the target device executing the set of codes. The method also includes determining second side-channel information associated with a simulated device in response to the set of codes. The simulated device has a pre-determined characteristic. The method further includes comparing a discriminatory feature of the first side-channel information with a discriminatory feature of the second side-channel information to determine a characteristic of the target device based on the pre-determined characteristic of the simulated device. Finally, the method includes sending, to a user interface, a second signal associated with the characteristic of the target device.

As used herein, a module or an engine can be, for example, any assembly, instructions and/or set of operatively-coupled electrical components, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "an electronic device" is intended to mean a single electronic device or multiple electronic devices. For another example, the term "a parameter" can mean a single parameter or multiple parameters.

Embodiments disclosed herein relate to a supply chain validation system that can detect fabrication information, an anomaly(ies) (e.g., a performance anomaly(ies), power consumption anomaly(ies), output anomaly(ies), etc.), malicious intrusions, unauthorized modifications, and tampering in digital circuits and computer-based systems, including critical embedded systems, coprocessors, and field-programmable gate arrays (FPGAs). In some instances, a physical side-channel (e.g., indirect measure of program execution such as power consumption, electromagnetic emissions, and other physical signals such as current, voltage, temperature, vibration, light, delay, impedance, vibration, pressure, global positioning system coordinates, and/or the like) can be used to assess the execution status in a target processor system (e.g., digital circuit or computer system) using a monitor and detect when an unauthorized execution has managed to disrupt or modify the normal operation of the target device or system. This process of detecting program execution anomaly is referred herein as "fingerprinting" or "signature analysis"; methods and apparatuses that implement fingerprinting can be referred to as a fingerprinting system or a signature system, which can be embodied in a number of different ways and forms. In some instances, such signature analysis can use, for example, a physical side channel to detect an anomaly in the operation of a target device or system. An example of a signature system is discussed in U.S. patent application Ser. No. 13/883,105, having a 35 U.S.C. § 371(c) date of Aug. 15, 2013 (U.S. Pat. No. 9,262,632), entitled "Using Power Fingerprinting (PFP) To Monitor The Integrity And Enhance Security Of Computer Based Systems." An example of a side-channel monitoring system is discussed in U.S. patent application Ser. No. 14/720,497, filed on May 22, 2015 (U.S. Pat. No. 9,268,938), entitled "Systems, Methods, and Apparatuses For Intrusion Detection And Analytics Using Power Characteristics Such As Side-Channel Information Collection."

Figure 1:
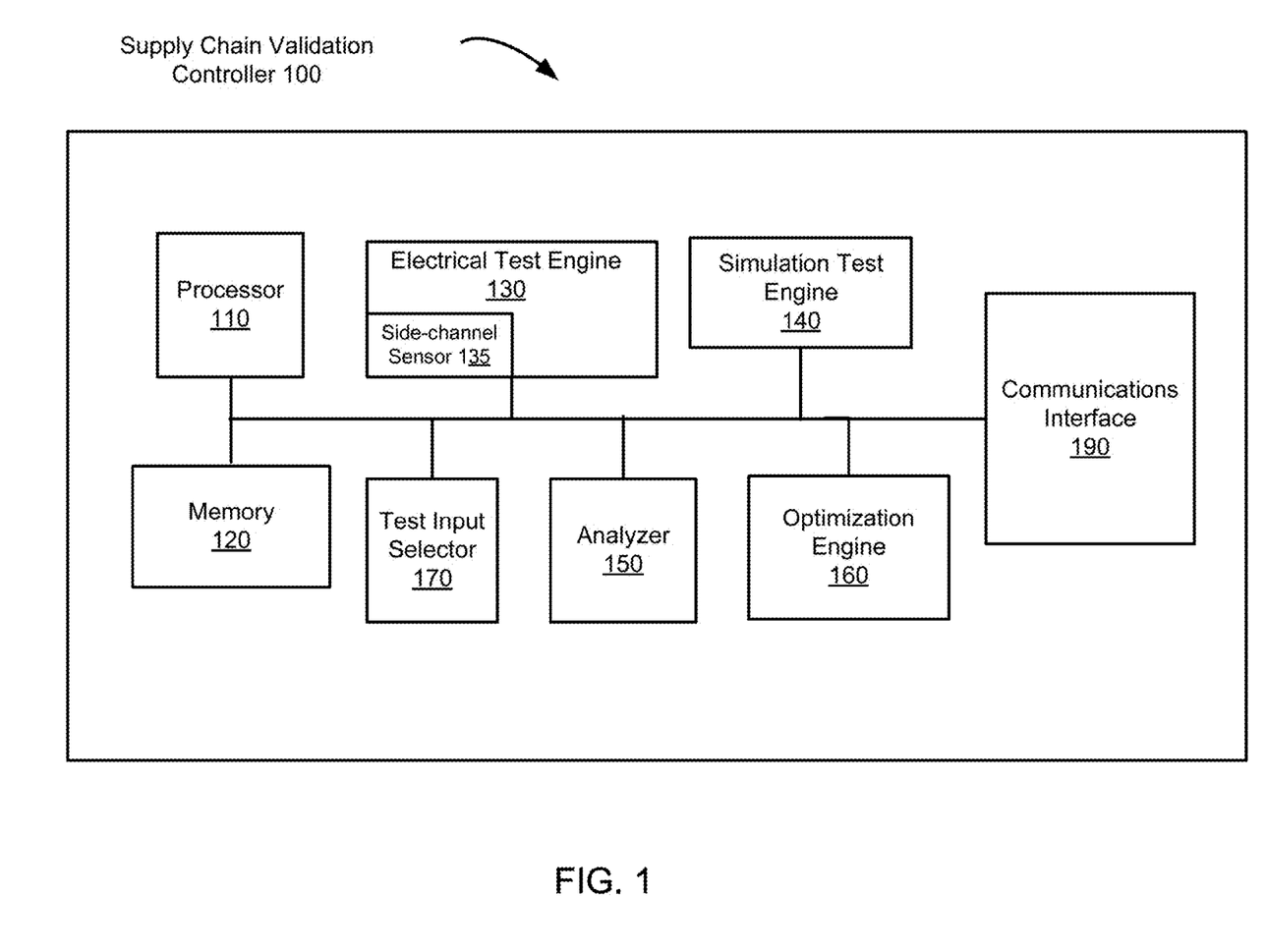
FIG. 1 is a schematic diagram illustrating aspects of a supply chain validation controller, according to an embodiment.

FIG. 1 is a schematic diagram illustrating aspects of a supply chain validation controller, according to an embodiment. The supply chain validation controller 100 can be configured to determine fabrication and/or supply chain information of electronic circuit(s) and/or electronic device(s) (referred hereinafter as devices or electronic devices). The electronic circuit(s) can include, for example, critical embedded systems, coprocessors, and field-programmable gate arrays (FPGAs). The electronic device(s) can include, for example, computers, cell phones, digital cameras, tablets, electrical circuit boards, and/or electronic components. The electronic device(s) can include analog circuits and/or digital circuits. In some instances, the electronic circuit(s) and the electronic device(s) can be sealed in a package. The fabrication and/or supply chain information includes, for example, a legitimacy status (e.g., a trusted device or an unauthorized device), the origin of foundry, foundry geographical information, layout of the electronic device, parasitic capacitance, propagation delays, natural occurring changes in the electronic device such as aging, software/firmware updates, environmental or circuit induced failure modes, malware, unauthorized updates, unauthorized hardware changes, and/or the like. The supply chain validation controller 100 can also be configured to monitor and characterize the electronic device through its product lifecycle. For example, the supply chain validation controller 100 can be configured to monitor and characterize natural occurring changes in the device such as aging, software/firmware updates, environmental- or circuit-induced failure modes, and unnatural occurring changes in the device such as malware, unauthorized updates, and unauthorized hardware changes. The supply chain validation controller 100 can also be configured to detect or identify device anomaly(ies) (e.g., counterfeits) based on one or more of the characteristics mentioned above.

In some implementations, the supply chain validation controller 100 can be a physical device external to the electronic device(s) (or target device(s)). In other implementations, the supply chain validation controller 100 can be a component within the target device or on a chip of the target device. In such implementations, the supply chain validation controller 100 can perform the supply chain validation processes described herein on the target device or the chip within which it is located. This allows the supply chain validation processes to be self-contained within the target device or the chip such that external processes or devices need not be involved in the performance of the supply chain validation processes described herein. When the supply chain validation controller 100 is a component on a chip of the target device, the side-channel information from known legitimate and/or non-legitimate devices (against which the side-channel responses from the chip of the target device is compared) are also stored on the chip. When an unauthorized party modifies the chip (e.g., via malicious intrusions), the reference side-channel information from the known legitimate and/or non-legitimate devices can be modified without authorizations. In such situations, the modified chip may pass the test and be inaccurately assessed to a legitimate (or trusted) device rather than properly assessed as a non-legitimate (or untrusted or tampered) device. To prevent this, a copy of the reference side-channel information from the known legitimate and/or non-legitimate devices can be maintained off-chip, in addition to the copy on-chip. In such a situation, for example, the side-channel responses from the chip of the target device can be compared to the reference side-channel information on-chip and the reference side-channel information off-chip. If the comparisons with the reference side-channel information off-chip yields a different result from the comparisons with the reference side-channel information on-chip, a determination can be made that the chip of the target device and the reference side-channel information on-chip have been modified without authorization.

As shown in FIG. 1, the supply chain validation controller 100 includes a processor 110, a memory 120, a communications interface 190, an electrical test engine 130, a simulation test engine 140, a test input selector 170, an analyzer 150, and an optimization engine 160. In some embodiments, the supply chain validation controller 100 can be a single physical device. In other embodiments, the supply chain validation controller 100 can include multiple physical devices (e.g., operatively coupled by a network), each of which can include one or multiple modules and/or components shown in FIG. 1.

Each module or component in the supply chain validation controller 100 can be operatively coupled to each remaining module and/or component. Each module and/or component in the supply chain validation controller 100 can be any combination of hardware and/or software (stored and/or executing in hardware) capable of performing one or more specific functions associated with that module and/or component.

The memory 120 can be, for example, a random-access memory (RAM) (e.g., a dynamic RAM, a static RAM), a flash memory, a removable memory, a hard drive, a database and/or so forth. In some embodiments, the memory 120 can include, for example, a database, process, application, virtual machine, and/or some other software modules (stored and/or executing in hardware) or hardware modules configured to execute a supply chain validation model design process as described herein with regards to FIG. 2, and a supply chain validation process as described herein with regards to FIG. 3, and/or one or more associated methods. In such embodiments, instructions of executing the supply chain validation model design process, and the supply chain validation process and/or the associated methods can be stored within the memory 120 and executed at the processor 110. In some embodiments, data can be stored in the memory 120 including for example data related to the target device, its measured characteristics and its simulated characteristics.

The communications interface 190 can include and/or be configured to manage one or multiple ports of the supply chain validation controller 100. In some instances, for example, the communications interface 190 (e.g., a Network Interface Card (NIC)) can be operatively coupled to other devices (e.g., user input devices not shown in FIG. 1) and can actively communicate with a coupled device or over a network (e.g., communicate with end-user devices, host devices, servers, etc.). The communication network can be any network or combination of networks capable of transmitting information (e.g., data and/or signals) and can include, for example, a telephone network, an Ethernet network, a fiber-optic network, a wireless network, and/or a cellular network. The communication can be over a network such as, for example, a Wi-Fi® or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection. In some embodiments, the communications interface 190 can be configured to, among other functions, receive data and/or information, and send supply chain validation modifications, commands, and/or instructions.

The processor 110 can be configured to control, for example, the operations of the communications interface 190, write data into and read data from the memory 120, and execute the instructions stored within the memory 120. The processor 110 can also be configured to execute and/or control, for example, the operations of the electrical test engine 130, the simulation test engine 140, the test input selector 170, the analyzer 150, and the optimization engine 160, as described in further detail herein. In some embodiments, under the control of the processor 110 and based on the methods or processes stored within the memory 120, the electrical test engine 130, the simulation test engine 140, the test input selector 170, the analyzer 150, and the optimization engine 160 can be configured to execute a supply chain validation model design process and a supply chain validation process, as described in further detail herein.

Each of the electrical test engine 130, the simulation test engine 140, the test input selector 170, the analyzer 150, and the optimization engine 160 can be a hardware module (e.g., critical embedded systems, coprocessors, and field-programmable gate arrays (FPGAs)) and/or software module (e.g., stored in a memory such as the memory 120 and/or executing in hardware such as the processor 110) in the supply chain validation controller 100. Each of the electrical test engine 130, the simulation test engine 140, the test input selector 170, the analyzer 150, and the optimization engine 160 in the supply chain validation controller 100 can be operatively coupled to each remaining module and/or component.

The electrical test engine 130 can include a detector (not shown in FIG. 1) configured to measure side-channel information of an electronic device using one or more side-channel sensors 135 under a given input or a set of given inputs. The side-channel information of an electronic device includes, for example, a program execution status, a power signature signal, electromagnetic emission, current, voltage, temperature, vibration, light, delay, impedance, vibration, pressure, or global positioning system coordinates. The electronic device can be a known trusted (or legitimate/authorized) device, or a known counterfeit (or non-legitimate/unauthorized) device, or a target (or unknown) device. The input or the set of inputs can be provided by the test input selector 170. The electrical test engine 130 can also include an analog processor, an analog-to-digital converter (ADC), and a digital signal processor to process the measured side-channel information. For example, the electrical test engine 130 can have the side-channel sensor 135/detector connected to the analog processor and/or to the ADC, which is in turn connected to the digital signal processor. The analog processor can receive the side-channel information from the side-channel sensor 135/detector and perform signal conditioning and processing (e.g., reducing extraneous information that need not be digitized) before sending the side-channel information to the ADC to convert the analog data to digital signals. The digital signal processor can receive the digital signals converted by the ADC and generate frequency domain signal components of the digitized signals for frequency domain analysis. The digitized signals can also be stored for later processing or transferred to the analyzer 150 to be processed. Alternatively, a side-channel sensor can be remote from the supply chain validation controller 110 and its detected sensor data can be sent to electrical test engine 130 for further processing.

The simulation test engine 140 can simulate side-channel information based on a simulated device (i.e., a model simulating the target device and defined by the optimization engine 160) under a given input or a set of given inputs. Modeling can be performed at the behavioral (i.e., functional) level or at the circuit level and employ a number of circuit simulation programs. Such simulation programs can estimate, for example, expected power dissipation, current/voltage flow, timing or delay, heat produces as well as other characteristics. The input or the set of inputs can also be provided to the simulation test engine 140 by the test input selector 170. The optimization engine 160 can provide the simulated device to the simulation test engine 140. Applying the inputs provided by the test input selector 170 (e.g., a list of code) to the model, the simulation test engine 140 can produce a set of outputs to evaluate functions of inputs (or the list of code), as well as side-channel information associated with each input.

The analyzer 150 can perform different signal processing approaches to extract discriminatory features (also referred herein to as characteristics) from the side-channel information captured by the electrical test engine 130 and/or identified by the simulation test engine 140. Feature extraction can involve analysis, for example, of resonance frequencies, absorption frequencies, polarization, harmonic reflections, reflection arrival times, and/or signal strength. In one embodiment, the analyzer 150 can compare the discriminatory features of the side-channel information from the electrical test and from the simulation test of a reference device (with a pre-determined characteristics such as a known trusted/authorized device or a known counterfeit/unauthorized device) such that the comparison results can be sent to the optimization engine 160 to optimize the model(s) used in the simulation test and to optimize the input vectors provided by the test input selector 170.

In another embodiment, the analyzer 150 can compare discriminatory features of the side-channel information from a target device and that from a simulated device having a pre-determined characteristic. The pre-determined characteristic can include any information related to the fabrication and/or supply chain information of the simulated device, including, but not limited, a legitimacy status (e.g., a trusted device or an unauthorized device), the origin of foundry, foundry geographical information, layout of the simulated device, parasitic capacitance, propagation delays, natural occurring changes in the simulated device such as aging, software/firmware updates, environmental or circuit induced failure modes, malware, unauthorized updates, unauthorized hardware changes, and/or the like. The pre-determined characteristic of the simulated device can be determined through analysis and/or measurements, for example, by using big-data analysis techniques on large sample sizes of reference devices. In such an embodiment, the side-channel information from the target device can be taken under the electrical test, and the side-channel information from the simulated device can be retrieved from the memory 120 storing the simulated side-channel information from the simulated device(s). The analyzer 150 can compare discriminatory features of the side-channel information from a target device and that from a simulated device having a pre-determined characteristic, and can determine a characteristic of the target device based on the pre-determined characteristic of the simulated device. In some instances, the analyzer 150 can further generate a statistical analysis indicating the likelihood of any fabrication/supply chain information of the target device. The analyzer 150 can send, to the communications interface 190, a signal associated with (e.g., representing or indicating) the characteristic of the target device.

The optimization engine 160 can develop a simulated device (i.e., a model simulating the target device) based on side-channel information of reference device(s) (e.g., known authorized devices or known unauthorized devices) to simulate a target (unknown) device and predict the supply chain information (e.g., a legitimacy status (e.g., a trusted device or an unauthorized device), the origin of foundry, foundry geographical information, and/or the like) of the target device. Modeling can be performed at the behavioral (i.e., functional) level or at the circuit level and employ a number of circuit simulation programs. Such simulation programs can estimate, for example, expected power dissipation, current/voltage flow, timing or delay, heat produces as well as other characteristics. In one implementation, the optimization engine 160 can develop the simulated device based on extrapolation of measured side-channel information of reference device(s) under electrical test(s). Once the simulated device is developed based on the reference devices, parameters associated with the simulated device can be adjusted to account for different fabrication processes associated with the target device to improve the prediction of the supply-chain information of the target device.

The simulated device can also be used by the simulation test engine 140 to simulate side-channel information of the simulated device under a given input or a set of given inputs. The simulated side-channel information can then be compared with the measured side-channel information by the analyzer 150 to provide a statistical analysis indicating a probability of any fabrication/supply chain information of the target device. In another implementation, the optimization engine 160 can adjust the model parameters to optimize the performance of the model based on the comparison of the side-channel information from the electrical test and from the simulation test of a reference device. The optimization engine 160 can adjust the model parameters (e.g., propagation delay, parasitic circuit, impedance (e.g., resistance), driving power, driving voltage, driving current, clock, external loading, or fabrication information, etc.) such that the discriminatory features of the side-channel responses from the simulation test substantially match that from the electrical test. When the side-channel responses from the simulation test substantially match that from the electrical test, the differences of certain discriminatory feature in the simulation test and the electrical test are within a predefined range (e.g., a threshold). In yet another implementation, the optimization engine 160 can adjust the input vectors provided by the test input selector 170 such that different side-channel responses can be measured given the different test input vectors.

The test input selector 170 can select inputs (or input vectors) for both electrical test and simulation test that activates the whole electronic device or specifically focuses on (or activates) a portion of the electronic device (e.g., less than the entirety of the electronic device). The inputs can include code to be executed on the electronic device. In one implementation, for example, a user or a test engineer can specify particular test inputs. Alternatively, the test input selector 170 can have a predefined list of inputs and select them in a predefined order. In another example, the inputs can be provided to the test input selector 170 by the optimization engine 160, as discussed earlier.

In use, according to an embodiment, the supply chain validation controller 100 can develop and optimize a simulated device (i.e., a model that simulates a target device) to predict side-channel responses of a target device given an input(s). Specifically, the electrical test engine 130 can receive the side-channel responses of a range of known devices (or reference devices) having a set of pre-determined characteristics. The set of pre-determined characteristics includes, for example, a legitimacy status, an aging status of circuits included in the reference device, an origin of a foundry of the circuits, geographical information of the foundry of the circuits, a layout of the circuits, malware, unauthorized hardware changes, an environment-induced failure mode, a circuit-induced failure mode, a software update status, or a firmware update status. The range of reference devices represents, for example, different fabrication conditions and supply-chain information such as age, foundry, and legitimacy. These side-channel responses may be extrapolated by the analyzer 150 to define a simulated device that accounts for the set of pre-determined characteristics representing different fabrication and/or supply chain information. For example, over time a semiconductor bias characteristic may change and by observing this progression with aging and using curve fitting the semiconductor bias characteristics can be predicted for some future date.

The simulation test engine 140 can measure side-channel information of the known device(s) using simulation methods based on the model under a given input or a set of given inputs. The input or the set of inputs can be selected by the test input selector 170 to activate the entire known device or specifically focus on (or activates) a portion of the hardware and/or software of the known device. The side-channel responses from the electrical test engine 130 and the simulation test engine 140 can be sent to the analyzer 150, which processes such signals and extracts (or identifies) discriminatory features of the side-channel responses from both tests. The analyzer 150 can compare the discriminatory features of the side-channel response from both tests and send the comparison results to the optimization engine 160. The optimization engine 160 can then adjust the model parameters (e.g., propagation delay, parasitic circuit, impedance (e.g., resistance), driving power, driving voltage, driving current, clock, external loading, fabrication information, etc.) such that the discriminatory features of the side-channel responses from the simulation test substantially match that from the electrical test. This can help optimizing the simulated device and identifying anomaly and fabrication information such as parasitic capacitance, propagation delays due to the layout, and/or the like. Simulated devices (or models) created by the analyzer 150 can be defined for legitimate/authorized devices as well as non-legitimate/unauthorized devices. Model parameters identified can also be used to assist in predicting the age of the device. The optimization engine 160 can also adjust the input vectors that are applied to the known device for the simulation test and the electrical test by the test input selector 170. The process of recording side-channel information from the electrical test and the simulation test, the comparison and the optimization of the model parameters and test vectors can be performed iteratively until a comparison metrics including various grades of information (e.g., gross power consumption or fine grain power consumption) meets a predefined threshold.

In use, the supply chain validation controller 100 can also evaluate a target device to determine characteristics of the target device. The characteristics of the target device include, for example, a legitimacy status (e.g., a trusted device or an unauthorized device), the origin of foundry, foundry geographical information, layout of the target device, parasitic capacitance, propagation delays, natural occurring changes in the target device such as aging, software/firmware updates, environmental or circuit induced failure modes, malware, unauthorized updates, unauthorized hardware changes, and/or the like. The supply chain validation controller 100 can also monitor and characterize the target device through its product life-cycle. The product life-cycle of the target device includes, for example, natural occurring changes in the target device such as aging, software/firmware updates, environmental or circuit induced failure modes, and unnatural occurring changes in the target device such as malware, unauthorized updates, and hardware changes.

Specifically, the test input selector 170 can provide a set of inputs that activate the area of hardware/software of the target device. The electrical test engine 130 can measure (or receive from side-channel sensors 135) side-channel information of the target device under the set of inputs. The test input selector 170 can also provide the set of inputs to the simulation test engine 140. The simulation test engine 140 can retrieve a simulated device (i.e., a model simulating the target device) and its associated characteristics (e.g., fabrication information and/or supply chain information) stored in the memory 120 (or a memory external to the supply chain validation controller 100). The simulation test engine 140 can determine side-channel information of the simulated device under the set of inputs and send such side-channel information to the analyzer 150.

Once the analyzer 150 extracts (or identifies) discriminatory features of the side-channel information of the target device and discriminatory features of the side-channel information of the simulated device, the analyzer 150 can compare the discriminatory features of the target device with the discriminatory features of the simulated device to determine a characteristic of the target device based on the pre-determined characteristic of the simulated device. In some instances, the analyzer 150 can provide a statistical analysis indicating a probability of a characteristic of the target device. For example, if the discriminatory features of the simulated device cannot match (or substantially match) the discriminatory features of the target device, the analyzer 150 may determine that the target device is likely to be an unauthorized device or a defective device. The analyzer 150 can then send to a user interface a signal associated with (e.g., representing or indicating) the characteristic of the target device. In some instances, while the discriminatory features of the simulated device can match (or substantially match) the discriminatory features of the target device, a pre-determined characteristic of the simulated device, however, may have a low probability for the expected fabrication or aging process. In such instances, the analyzer 150 can determine that the target device is likely to be an unauthorized device or a defective device. The analyzer can also sent a signal to the user interface associated with projected aging characteristics of the target device and/or past side-channel measurements of the target device.

The analyzer 150 can further define a library of expected side-channel responses (and/or their models) and the statistical properties (or characteristics) for various circuits, designs, fabrication foundry, and device ages. In some implementations, the supply chain validation controller 100 (e.g., the analyzer 150) can correlate elements of the side-channel responses to other testing results, such as functional or visual inspection, to better identify the mechanisms of how the side-channel response correlates with other anomalous behaviors or device problems. The supply chain validation controller 100 can monitor and characterize side-channel information of the target device through its product life-cycle, from cradle to grave, for natural occurring changes in the target device such as aging, software/firmware updates, environmental or circuit induced failure modes, and unnatural occurring changes such as malware, unauthorized updates, and hardware changes. In some implementations, the supply chain validation controller 100 can define a specific model for side-channel response when the target device is subject to certain types of attacks, flaws or use cases to help with device forensics.

In one embodiment, once the analyzer 150 provides a statistical analysis indicating a probability of a characteristic of the target device, a response generator (not shown in FIG. 1) can be configured to trigger automatic actions that affect the target device in response to the probability of the characteristic of the target device being legitimate. Some of the actions/responses can include, but not limited to, remediating when the target device is determined non-legitimate, returning the target device to a known state, storing a failed test on or off chip, altering the circuit function of the target device, activating another device, disabling control ports of the target device, notifying user of status and/or testing information the target device, triggering the target device for reboot and reinitiating virtualization, extra intelligence/analysis, collecting data for forensics purposes, collecting data for a blacklist for spotting intrusions, and/or the like.

In use, in some implementations, the supply chain validation controller 100 can be a component within the target device or on a chip of the target device. In such implementations, the supply chain validation controller 100 can perform the supply chain validation processes described herein on the target device or the chip within which it is located. This allows the supply chain validation processes to be self-contained within the target device or the chip such that external processes or devices need not be involved in the performance of the supply chain validation processes described herein. When the supply chain validation controller 100 is a component on a chip of the target device, the side-channel information from reference devices (e.g., known legitimate and/or non-legitimate devices) and/or the simulated devices and its associated characteristics and parameters are also stored on the chip. When an unauthorized party modifies the chip (e.g., via malicious intrusions), the reference side-channel information from the known legitimate and/or non-legitimate devices and/or the simulated devices and its associated characteristics and/or parameters can be modified without authorizations. In such situations, the modified chip may pass the validation process and be inaccurately assessed as a legitimate (or trusted) device rather than properly assessed as a non-legitimate (or untrusted or tampered) device. To prevent this, a copy of the reference side-channel information from the known legitimate and/or non-legitimate devices can be maintained off-chip, in addition to the copy on-chip. A copy of the simulated device and a copy of the set of parameters can be stored off-chip (e.g., a memory external to the target device), in addition to the copy on-chip. In such a situation, for example, the side-channel responses from the chip of the target device can be compared to the side-channel information of the simulated device stored on-chip and the side-channel information of the simulated device stored off-chip. If the comparisons with the side-channel information of the simulated device stored off-chip yields a different result from the comparisons with the side-channel information of the simulated device stored on-chip, a determination can be made that the chip of the target device and the side-channel information of the simulated device stored on-chip have been modified without authorization.

Note that although many embodiments are described herein as relating to the capture of side-channel information during the operation of an electronic device, in alternative embodiments side-channel information can be captured from an electronic device during the excitation with an external signal. Such an external signal can be, for example, an electromagnetic interference (EMI) pulse, a white noise signal and/or an ultra-wide band signal. Such capture during the excitation with an external signal can be performed when the electronic device is not operating or when the electronic device is operating.

Figure 2:
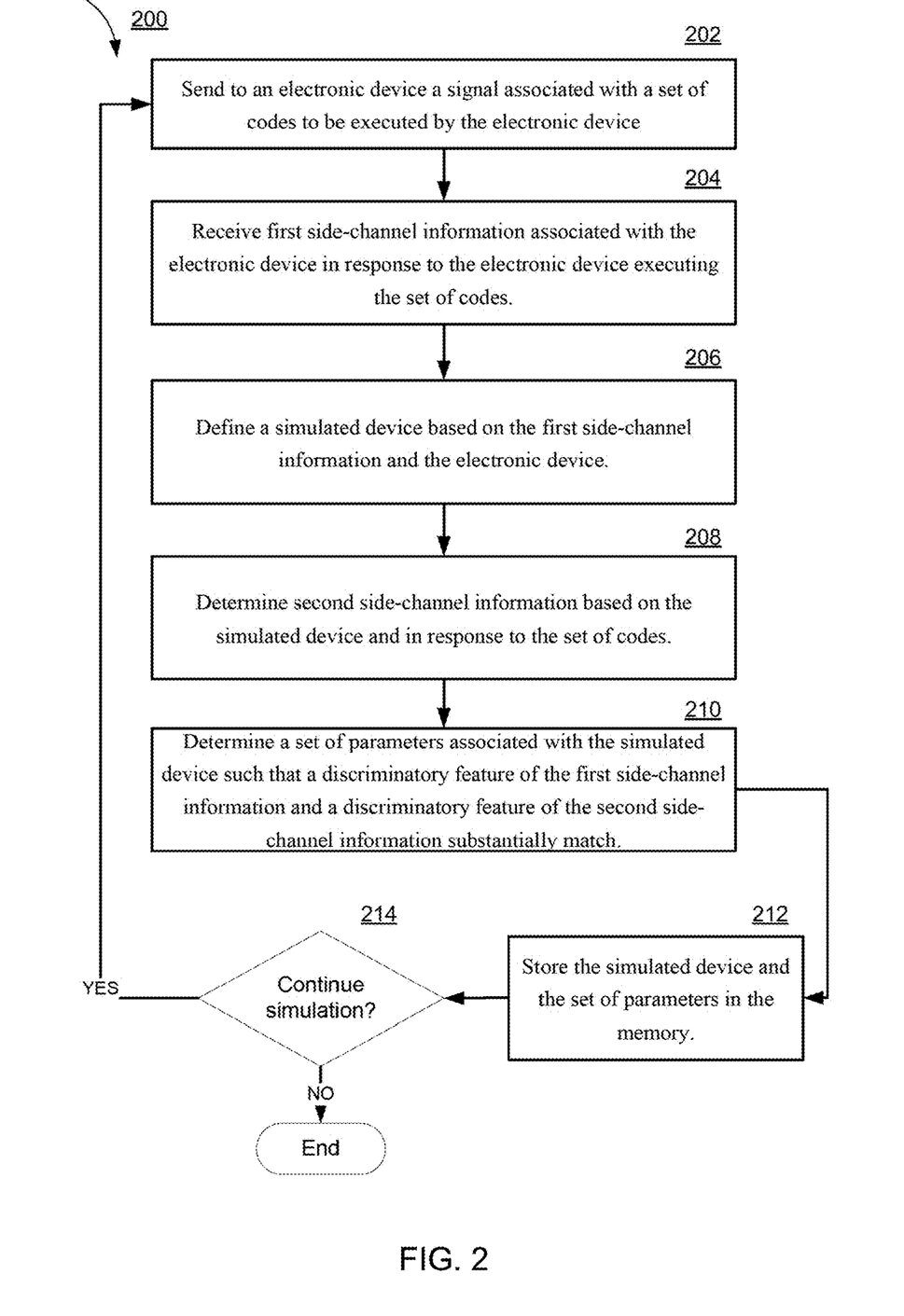
FIG. 2 is a flow chart showing the process of supply chain validation model design, according to an embodiment.

FIG. 2 is a flow chart showing the process of supply chain validation model design, according to an embodiment. The supply chain validation model design method 200 can be executed at, for example, a supply chain validation controller such as the supply chain validation controller 100 shown and described with respect to FIG. 1. In some embodiments, the supply chain validation controller (e.g., the simulation test engine 140 in FIG. 1) sends to an electronic device (or a reference device) a signal associated with a set of inputs to be processed by the electronic device at 202. The set of inputs includes code to be executed on the electronic device. The set of inputs can activate the whole electronic device or specifically focuses on (or activates) a portion of the electronic device (e.g., less than the entirety of the electronic device). The electronic device has pre-determined characteristics, which includes, but not limited to, a legitimacy status, an aging status of circuits included in the electronic device, an origin of a foundry of the circuits, geographical information of the foundry of the circuits, a layout of the circuits, malware, unauthorized hardware changes, an environment-induced failure mode, a circuit-induced failure mode, a software update status, or a firmware update status.

At 204, the supply chain validation controller measures side-channel information of the electronic device in response to the electronic device executing the set of inputs. The supply chain validation controller includes sensors (or detector(s)) to measure the side-channel information. The side-channel information of an electronic device includes, for example, one or more of a program execution status, a power signature signal, electromagnetic emission, current, voltage, temperature, vibration, light, delay, impedance, vibration, pressure, or global positioning system coordinates.

At 206, the supply chain validation controller defines a simulated device (i.e., a model simulating the electronic device) based on the electronic device and the side-channel information of the electronic device. At 208, the supply chain validation controller determines side-channel information based on the simulated device in response to the simulated device executing the set of inputs.

At 210, the supply chain validation controller determines a set of parameters associated with the simulated device such that a discriminatory feature of the first side-channel information and a discriminatory feature of the second side-channel information substantially match. The supply chain validation controller performs different signal processing approaches to extract discriminatory features from the side-channel information of the electronic device and the side-channel information of the simulated device. Feature extraction can involve analysis, for example, of resonance frequencies, absorption frequencies, polarization, harmonic reflections, reflection arrival times, and/or signal strength. The set of parameters of the simulated device includes, for example, at least one of a propagation delay, a parasitic circuit, impedance (e.g., resistance), driving power, driving voltage, driving current, clock, external loading, or fabrication information. The simulated device includes a set of characteristics corresponding to pre-determined characteristics of the electronic device when the discriminatory feature of the simulated device substantially matches the discriminatory feature of the electronic device. At 212, the supply chain validation controller stores the simulated device and the set of parameters in a memory. At 214, the supply chain validation controller continues the simulation to optimize the simulation parameters until a comparison metric meets a predefined threshold. When the comparison metric meets the predefined threshold, the supply chain validation controller stores the optimized simulated device and the optimized set of parameters in the memory.

Figure 3:
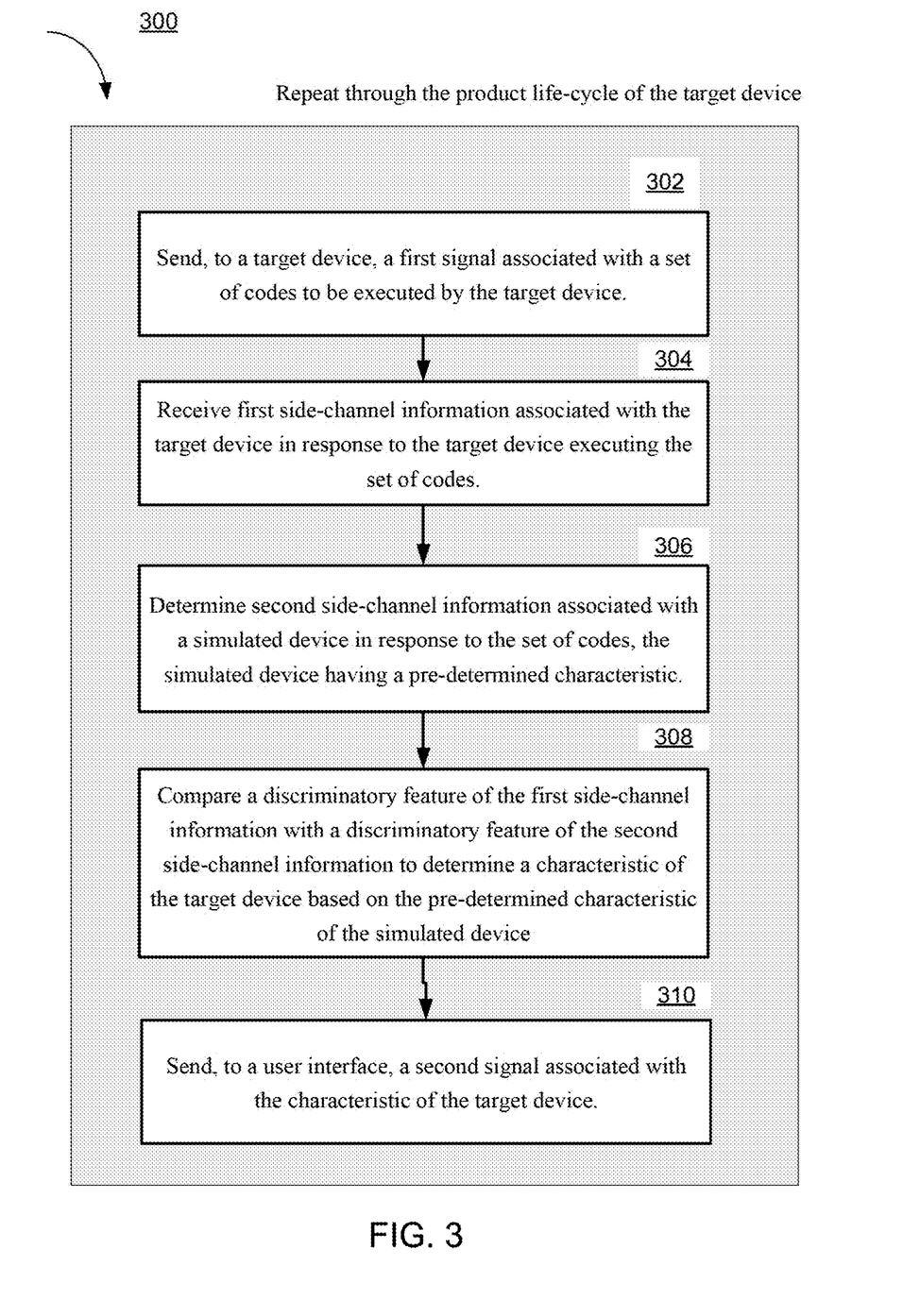
FIG. 3 is a flow chart showing the process of validating supply chain for electronic devices, according to an embodiment.

FIG. 3 is a flow chart showing the process of validating supply chain for target devices, according to an embodiment. The supply chain validation method 300 can be executed at, for example, a supply chain validation controller such as the supply chain validation controller 100 shown and described with respect to FIG. 1. In some embodiments, the supply chain validation controller sends to a target device a signal associated with a set of inputs to be processed by the target device at 302. The set of inputs includes code to be executed by the target device. Similar to the supply chain validation model design method 200, the set of inputs can activate the whole electronic device or specifically focuses on (or activates) a portion of the electronic device (e.g., less than the entirety of the electronic device).

At 304, the supply chain validation controller receives side-channel information associated with the target device in response to the target device executing the set of inputs. At 306, the supply chain validation controller determines side-channel information associated with a simulated device in response to the set of codes. The simulated device has a pre-determined characteristic, which includes, but not limited to, a legitimacy status, an aging status of circuits included in the electronic device, an origin of a foundry of the circuits, geographical information of the foundry of the circuits, a layout of the circuits, malware, unauthorized hardware changes, an environment-induced failure mode, a circuit-induced failure mode, a software update status, or a firmware update status. Prior to step 306, the supply chain validation controller retrieves the simulated device (and/or its associated parameters and pre-determined characteristics) from a memory.

At 308, the supply chain validation controller extracts discriminatory features of the side-channel information of the target device and discriminatory features of the side-channel information of the simulated device. The supply chain validation controller further compares the discriminatory features of the target device with the discriminatory features of the simulated device to determine a characteristic of the target device based on the pre-determined characteristic of the simulated device. At 310, the supply chain validation controller sends, to a user interface, a signal associated with the characteristic of the target device. In some implementations, the supply chain validation controller determines a probability value associated with the characteristic of the target device. The supply chain validation controller can repeat the supply chain validation method 300 through the product life-cycle of the target device to monitor and characterize natural occurring changes in the device such as aging, software/firmware updates, environmental or circuit induced failure modes, and unnatural occurring changes in the target device such as malware, unauthorized updates, and hardware changes.

In some instances, based on the characteristic of the target device or an estimated probability of having the characteristic of the target device, the supply chain validation controller can trigger automatic actions that affect the target device in response to the estimated probability. The probability can be estimated, for example, by using statistical distributions that reflect variations of reference devices. These statistical distributions may be determined (or estimated) using theoretical models or extrapolated from data measured across a large number of references devices. The supply chain validation controller can trigger actions/responses including, but not limited to, remediating when the target device is determined non-legitimate, returning the target device to a known state, storing a failed test on or off chip, altering the circuit function of the target device, activating another device, disabling control ports of the target device, notifying user of status and/or testing information the target device, triggering the target device for reboot and reinitiating virtualization, extra intelligence/analysis, collecting data for forensics purposes, collecting data for a blacklist for spotting intrusions, and/or the like.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, JavaScript (e.g., ECMAScript 6), Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein. Each of the devices described herein, for example, the supply chain validation controller 100, the electrical test engine 130, the simulation test engine 140, the test input selector 170, the analyzer 150, the optimization engine 160, can include one or more memories and/or computer readable media as described above.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
a memory; and
a processor operatively coupled to the memory and configured to be coupled to an electronic device, the electronic device having a pre-determined characteristic including information of a foundry of circuits included in the electronic device,
the processor configured to send to the electronic device a signal associated with a set of inputs to be executed by the electronic device,
the processor configured to receive first side-channel information associated with the electronic device in response to the electronic device executing the set of inputs,
the processor configured to define a simulated device based on the first side-channel information and the electronic device, the simulated device simulating the electronic device,
the processor configured to determine second side-channel information based on the simulated device and in response to the set of inputs,
the processor configured to determine a set of parameters associated with the simulated device such that a discriminatory feature of the first side-channel information and a discriminatory feature of the second side-channel information substantially match and the information of the foundry of the circuits in the electronic device corresponds to information of a foundry of circuits included in the simulated device,
the processor configured to store the simulated device and the set of parameters in the memory.

2. The apparatus of claim 1, wherein the pre-determined characteristic includes at least one of a legitimacy status, an aging status of the circuits included in the electronic device, an origin of the foundry of the circuits included in the electronic device, geographical information of the foundry of the circuits included in the electronic device, a layout of the circuits included in the electronic device, malware, unauthorized hardware changes, an environment-induced failure mode, a circuit-induced failure mode, a software update status, or a firmware update status.

3. The apparatus of claim 1, wherein the first side-channel information includes at least one of a program execution status, a power signature signal, electromagnetic emission, current, voltage, temperature, vibration, light, delay, impedance, vibration, pressure, or global positioning system coordinates.

4. The apparatus of claim 1, wherein the processor is configured to determine the set of inputs such that the set of inputs activates a portion of the electronic device.

5. The apparatus of claim 1, wherein the set of parameters includes at least one of a propagation delay, a parasitic circuit, impedance, driving power, driving voltage, driving current, clock, external loading, or fabrication information.

6. The apparatus of claim 1, wherein:
the signal is a first signal, the set of inputs is a first set of inputs,
the processor is configured to be operatively coupled to a target device,
the processor is configured to send to the target device a second signal associated with a second set of inputs to be executed by the target device,
the processor is configured to receive third side-channel information associated with the target device in response to the target device executing the second set of inputs,
the processor is configured to determine fourth side-channel information associated with the simulated device and in response to the second set of inputs,
the processor is configured to compare the third side-channel information with the fourth side-channel information to determine a characteristic of the target device based on the pre-determined characteristic of the electronic device,
the processor is configured to send, to a user interface, a third signal associated with the characteristic of the target device.

7. The apparatus of claim 6, wherein the processor and the memory are disposed on a chip of the target device.

8. The apparatus of claim 6, wherein:
the memory is a first memory,
the processor and the first memory are disposed on a chip of the target device, and
a copy of the simulated device and a copy of the set of parameters are stored in a second memory external to the target device.

9. The apparatus of claim 6, wherein the processor is configured to determine a response action based on the characteristic of the target device, the response action includes at least one of remediating when the target device is determined non-legitimate, returning the target device to a known state, storing a failed test on or off a chip of the target device, altering circuit function of the target device, disabling control ports of the target device, triggering the target device for reboot, triggering the target device to reinitiate virtualization, collecting data for forensics purposes, or collecting data for a blacklist for spotting intrusions.

10. The apparatus of claim 6, wherein the processor is configured to determine the characteristic of the target device through a product life-cycle of the target device.

11. The apparatus of claim 1, wherein the set of inputs includes a set of codes.

12. A method, comprising:
sending, to a target device, a first signal associated with a set of codes to be executed by the target device;
receiving first side-channel information associated with the target device in response to the target device executing the set of codes;
determining second side-channel information associated with a simulated device in response to the set of codes, the simulated device having a pre-determined characteristic including information of a foundry of circuits included in the simulated device;
comparing a discriminatory feature of the first side-channel information with a discriminatory feature of the second side-channel information to determine a characteristic of the target device based on the pre-determined characteristic of the simulated device, to indicate a probability that information of a foundry of circuits included in the target device corresponds to the information of the foundry of the circuits included in the simulated device; and
sending, to a user interface, a second signal associated with the characteristic of the target device.

13. The method of claim 12, further comprising:
retrieving, prior to determining the second side-channel information, the simulated device.

14. The method of claim 12, further comprising:
determining a response action based on the characteristic of the target device, the response action includes at least one of remediating when the target device is determined non-legitimate, returning the target device to a known state, storing a failed test on or off a chip of the target device, altering circuit function of the target device, disabling control ports of the target device, triggering the target device for reboot, triggering the target device to reinitiate virtualization, collecting data for forensics purposes, or collecting data for a blacklist for spotting intrusions.

15. The method of claim 12, further comprising:
determining the characteristic of the target device through a product life-cycle of the target device.

16. The method of claim 12, wherein the set of codes activates a portion of the target device.

17. The method of claim 12, wherein the first side-channel information includes at least one of a program execution status, a power signature signal, electromagnetic emission, current, voltage, temperature, vibration, light, delay, impedance, vibration, pressure, or global positioning system coordinates.

18. The method of claim 12, wherein the characteristic of the target device includes at least one of a legitimacy status, an aging status of the circuits included in the target device, an origin of the foundry of the circuits included in the target device, geographical information of the foundry of the circuits included in the target device, a layout of the circuits included in the target device, malware, unauthorized hardware changes, an environment-induced failure mode, a circuit-induced failure mode, a software update status, or a firmware update status.

19. An apparatus, comprising:
a side-channel sensor configured to capture side-channel information associated with the apparatus, and
a processor operatively coupled to the side-channel sensor and a memory, the processor configured to retrieve a set of codes from the memory and execute the set of codes,
the processor configured to receive a first side-channel information from the side-channel sensor in response to the processor executing the set of codes,
the processor configured to determine second side-channel information associated with a simulated device in response to the set of codes, the simulated device having a pre-determined characteristic including information of a foundry of circuits included in the simulated device,
the processor configured to compare a discriminatory feature of the first side-channel information with a discriminatory feature of the second side-channel information to determine a characteristic of the apparatus based on the pre-determined characteristic of the simulated device, to indicate a probability that information of a foundry of circuits included in the apparatus corresponds to the information of the foundry of the circuits included in the simulated device, and
the processor configured to send, to a user interface, a signal associated with the characteristic of the apparatus.

20. The apparatus of claim 19, wherein:
the signal is a first signal, the memory is a first memory, the simulated device is a first simulated device, the pre-determined characteristic is a first pre-determined characteristic, the characteristic of the apparatus is a first characteristic of the apparatus,
the processor is configured to be operatively coupled to a second memory external to the apparatus,
the processor is configured to retrieve, from the second memory, third side-channel information associated with (1) a second simulated device and (2) the set of codes, the second simulated device having a second pre-determined characteristic,
the processor is configured to compare the discriminatory feature of the first side-channel information with a discriminatory feature of the third side-channel information to determine a second characteristic of the apparatus based on the second pre-determined characteristic of the second simulated device,
the processor is configured to send, to the user interface, a second signal associated with the second characteristic of the apparatus.

21. The apparatus of claim 19, wherein the processor is configured to determine the characteristic of the apparatus through a product life-cycle of the apparatus.

22. An apparatus, comprising:
a memory; and
a processor operatively coupled to the memory and configured to be coupled to an electronic device and a target device, the electronic device having a pre-determined characteristic,
the processor configured to send to the electronic device a first signal associated with a first set of inputs to be executed by the electronic device,
the processor configured to receive first side-channel information associated with the electronic device in response to the electronic device executing the first set of inputs,
the processor configured to define a simulated device based on the first side-channel information and the electronic device, the simulated device simulating the electronic device,
the processor configured to determine second side-channel information based on the simulated device and in response to the first set of inputs,
the processor configured to determine a set of parameters associated with the simulated device such that a discriminatory feature of the first side-channel information and a discriminatory feature of the second side-channel information substantially match,
the processor configured to store the simulated device and the set of parameters in the memory,
the processor is configured to send to the target device a second signal associated with a second set of inputs to be executed by the target device, the processor is configured to receive third side-channel information associated with the target device in response to the target device executing the second set of inputs, the processor is configured to determine fourth side-channel information associated with the simulated device and in response to the second set of inputs, the processor is configured to compare the third side-channel information with the fourth side-channel information to determine a characteristic of the target device based on the pre-determined characteristic of the electronic device, the processor is configured to send, to a user interface, a third signal associated with the characteristic of the target device.

23. An apparatus, comprising:

a side-channel sensor configured to capture side-channel information associated with the apparatus, and a processor operatively coupled to the side-channel sensor and a first memory, the processor configured to retrieve a set of codes from the first memory and execute the set of codes, the processor configured to receive a first side-channel information from the side-channel sensor in response to the processor executing the set of codes, the processor configured to determine second side-channel information associated with a first simulated device in response to the set of codes, the simulated device having a first pre-determined characteristic, the processor configured to compare a discriminatory feature of the first side-channel information with a discriminatory feature of the second side-channel information to determine a first characteristic of the apparatus based on the first pre-determined characteristic of the simulated device, the processor configured to send, to a user interface, a first signal associated with the characteristic of the apparatus, the processor is configured to retrieve, from a second memory, third side-channel information associated with (1) a second simulated device and (2) the set of codes, the second simulated device having a second pre-determined characteristic, the processor is configured to compare the discriminatory feature of the first side-channel information with a discriminatory feature of the third side-channel information to determine a second characteristic of the apparatus based on the second pre-determined characteristic of the second simulated device, the processor is configured to send, to the user interface, a second signal associated with the second characteristic of the apparatus.

24. A method, comprising:

sending, from a processor to a target device, a first signal associated with a set of codes to be executed by the target device, a chip of the processor not located within the target device;

receiving, at the processor, first side-channel information associated with the target device in response to the target device executing the set of codes;

determining, at the processor, second side-channel information associated with a simulated device in response to the set of codes, the simulated device having a pre-determined characteristic;

comparing, at the processor, a discriminatory feature of the first side-channel information with a discriminatory feature of the second side-channel information to determine a characteristic of the target device based on the pre-determined characteristic of the simulated device; and sending, from the processor to a user interface, a second signal associated with the characteristic of the target device.

* * * * *